United States Patent
Simmelink et al.

(10) Patent No.: US 9,194,059 B2
(45) Date of Patent: Nov. 24, 2015

(54) PROCESS FOR SPINNING UHMWPE, UHMWPE MULTIFILAMENT YARNS PRODUCED THEREOF AND THEIR USE

(71) Applicant: DSM IP ASSETS B.V., Heerlen (NL)

(72) Inventors: Joseph Arnold Paul Maria Simmelink, Dilsen-Stokkem (BE); Roelof Marissen, Born (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 13/889,204

(22) Filed: May 7, 2013

(65) Prior Publication Data
US 2013/0241104 A1    Sep. 19, 2013

Related U.S. Application Data

(62) Division of application No. 12/747,968, filed as application No. PCT/EP2008/010748 on Dec. 17, 2008, now abandoned.

(30) Foreign Application Priority Data

Dec. 17, 2007    (EP) ..................... 07024437

(51) Int. Cl.
*D01F 6/00* (2006.01)
*D01D 5/06* (2006.01)
*D01F 6/04* (2006.01)

(52) U.S. Cl.
CPC .. *D01D 5/06* (2013.01); *D01F 6/04* (2013.01); *Y10T 428/2913* (2015.01); *Y10T 428/2915* (2015.01); *Y10T 442/69* (2015.04)

(58) Field of Classification Search
CPC .................................... D01D 5/06; D01D 5/12
USPC ............................ 264/165, 211.14; 428/364
See application file for complete search history.

(56) References Cited

U.S. PATENT DOCUMENTS

| | | | |
|---|---|---|---|
| 2007/0154707 A1* | 7/2007 | Simmelink et al. | 428/364 |
| 2007/0269654 A1 | 11/2007 | Veillat et al. | |
| 2009/0269581 A1 | 10/2009 | Fukushima et al. | |

FOREIGN PATENT DOCUMENTS

| | | |
|---|---|---|
| CN | 1 400 342 | 3/2003 |
| EP | 0 213 208 | 3/1987 |
| EP | 1 350 868 | 10/2003 |
| JP | 2000-226721 | 8/2000 |
| WO | 01/73173 | 10/2001 |
| WO | 2005/066401 | 7/2005 |

OTHER PUBLICATIONS

International Search Report for PCT/EP2008/010748, mailed Jul. 14, 2009.
*Spinneret*, Mingde Gong, China Textile & Apparel Press, 1$^{st}$ Ed., Mar. 1978, pp. 1-5.
CN Appln. No. 200880120973.1, The Second Office Action, Jun. 15, 2012.

* cited by examiner

*Primary Examiner* — Galen Hauth
(74) *Attorney, Agent, or Firm* — Nixon & Vanderhye P.C.

(57) ABSTRACT

Gel-spinning processes for producing a high tensile strength ultra high molecular weight polyethylene (UHMWPE) multifilament yarn comprising ultra-low dtex filaments, include applying a draw ratio $DR_{fluid}$ to fluid filaments obtained by spinning a solution of UHMWPE through a spinneret and into an air gap, is at least 450, wherein $DR_{fluid} = DR_{sp} \times DR_{ag}$, the $DR_{sp}$ and $DR_{ag}$ being the draw ratios in the spinholes and in the air gap, respectively; and provided that $DR_{ag}$ is at least 30. The UHMWPE multifilament yarns produced thereof were characterized by a tensile strength of at least 3.5 GPa and contained filaments having a dtex of at most 0.5. The invention further relates to products comprising said yarns, e.g. fabrics, medical devices and composite and ballistic articles.

14 Claims, No Drawings

PROCESS FOR SPINNING UHMWPE, UHMWPE MULTIFILAMENT YARNS PRODUCED THEREOF AND THEIR USE This application is a divisional of commonly owned copending U.S. application Ser. No. 12/747,968, filed Jun. 14, 2010 (now abandoned), which is the national phase application under 35 USC §371 of PCT/EP2008/010748, filed Dec. 17, 2008 which designated the US and claims benefit of European Application 07024437.1, filed Dec. 17, 2007, the entire contents of each of which are hereby incorporated by reference.

The invention relates to a gel-spinning process for producing a high tensile strength ultra high molecular weight polyethylene (UHMWPE) multifilament yarn comprising ultra-low dtex filaments and to a UHMWPE multifilament yarn produced thereof. The invention further relates to products comprising said yarns.

A gel-spinning process for producing UHMWPE multifilament yarns having a high tensile strength is known for example from EP 1,699,954. The process disclosed therein comprises the steps of:

a) Preparing a solution of an UHMWPE in a solvent;
b) Spinning through a spinneret and into an air gap the solution of step a) to form fluid filaments, the spinneret containing multiple spinholes and wherein each spinhole comprises at least one zone with a gradual decrease in diameter and wherein the downstream diameter of the spinhole from which the solution is issued in the air gap is between 0.1 and 1.5 mm;
c) Drawing the fluid filaments with a fluid draw ratio $DR_{fluid}=DR_{sp} \times DR_{ag}$, wherein $DR_{sp}$ and $DR_{ag}$ are the draw ratios in the spinholes and in the air gap, respectively; and
d) Cooling the fluid filaments to form solvent-containing gel filaments; and
e) Removing at least partly the remaining solvent from the gel filaments to form solid filaments, before, during or after drawing the solid filaments with a draw ratio $DR_{solid}$ of at least 4.

The UHMWPE multifilament yarns produced thereof presented tensile strengths as high as 5 GPa, however, the yarns contained relatively thick filaments in the range of 1 dtex.

A gel-spinning process wherein relatively high tensile strength UHMWPE multifilament yarns are produced, containing however thinner filaments thereof, is known for example from the Chinese Patent No. 1,400,342, hereafter CN 1,400,342. Said publication discloses both a melt and a gel spinning process. With reference to the gel spinning process, a solution of between 4 and 15 wt-% of an UHMWPE with molecular weight between $1 \times 10^6$ and $6 \times 10^6$ g/mol is spun through a spinneret with spinholes of a diameter in the range of 0.6-1 mm to form fluid filaments. The fluid filaments are drawn with draw ratios of maximum 35 according to its Example 1. The maximum total draw ratio achieved for a gel spun filament was about 390. According to the referred publication, for a highly concentrated UHMWPE solution, i.e. around 15 wt-%, a low fluid draw ratio should be applied to prevent filament breakage and for a dilute UHMWPE solution, i.e. around 4 wt-%, the fluid draw ratio can be increased the maximum achieved being about 35, i.e. according to Example 1 using a 7 wt-% concentrated UHMWPE solution. According to CN 1,400,342 by stretching further above the disclosed limits, it is not possible to obtain UHMWPE filaments with a structure having an "appropriate degree of macromolecular entanglements". Lacking the appropriate degree of entanglements, the obtained filaments are difficult to draw further this also explaining the low overall draw ratio achieved therein. UHMWPE multifilament yarns were obtained having tensile strengths as high as 4.3 GPa, and containing filaments having a dtex of not smaller than 0.55 (0.5 den).

A further gel-spinning process for obtaining UHMWPE multifilament yarns comprising filaments having however an ultra-low dtex is known from the Japanese Patent Publication No. 2000/226721, hereafter JP 2000/226721. The gel-spinning process disclosed therein used even smaller diameters for the spinholes of the spinneret, in the range of 0.3-0.5 mm. The extruded fluid filaments were drawn up to a draw ratio of 50 and again after becoming solid filaments to a total draw ratio of about 200. The obtained UHMWPE filaments had a dtex as low as 0.121. However, the tensile strength of the multifilament yarn comprising these filaments was rather low, i.e. not higher than 3.2 GPa. A further drawback of the process is reduced productivity, because the amount of UHMWPE solution spun through the spinholes is limited by their very small diameter.

Therefore, it is not by any means trivial for anyone skilled in the art to obtain UHMWPE multifilament yarns comprising ultra-low dtex filaments and having a high tensile strength thereof. Yet even more, it is difficult to design a process of making thereof, having a good productivity.

It is the object of the invention to provide gel spun UHMWPE multifilament yarns having a high tensile strength and comprising ultra-low dtex filaments, combination that is not met by any of the existent gel spun UHMWPE multifilament yarns and for a process for the preparation thereof. A further object of the invention is to provide such a process that has good productivity.

The proposed object was achieved with a gel spun process characterized in that the fluid filaments are drawn with a fluid draw ratio $DR_{fluid}$ of at least 450, provided that $DR_{ag}$ is at least 30.

Surprisingly, it was found that with the process of the invention, novel UHMWPE multifilament yarns were obtained having a tensile strength of at least 3.5 GPa and comprising filaments with a dtex of no more than 0.5; a combination which to inventors' knowledge was never achieved hitherto and which in itself was unexpected.

It was also surprisingly found that in the process of the invention, the amount of spin breaks occurring when spinning ultra-low dtex UHMWPE filaments due to tearing of said filaments at the spinneret was reduced. The low amount of spin breaks positively contributing to the productivity of the process.

The UHMWPE solution is preferably prepared with a concentration of between 1 and 20 wt-%, more preferably of between 2 and 15 wt-%, even more preferably of between 3 and 10 wt-%, most preferably of between 4 and 8 wt-%, with a lower concentration being preferred the higher the molar mass of the UHMWPE is.

The UHMWPE has preferably an intrinsic viscosity (IV), as measured on solution in decalin at 135° C., of at least 3 dl/g, preferably at least 5 dl/g, more preferably at least 7 dl/g, even more preferably at least 9 dl/g, most preferably at least 11 dl/g. Preferably, the IV is at most 40 dl/g, more preferably at most 30 dl/g, even more preferably at most 25 dl/g, yet even more preferably at most 20 dl/g, most preferably at most 15 dl/g.

The UHMWPE may be any UHMWPE suitable for gel spinning processes. Preferably, the UHMWPE is a linear polyethylene with less than one branch per 100 carbon atoms, and preferably less than one branch per 300 carbon atoms. By branch, also known as side chain is herein understood a branch of the main UHMWPE chain, said branch preferably containing between 1 and 10 carbon atoms, more preferably between 1 and 8, even more preferably between 1 and 6. The linear polyethylene may further contain up to 5 mol % of one or more comonomers, such as alkenes like propylene, butene, pentene, 4-methylpentene or octene and also preferably less than 5 wt-%, more preferably less than 3 wt-% of customary additives, such as anti-oxidants, thermal stabilizers, colorants, flow promoters, etc.

In a preferred embodiment, the UHMWPE contains at least 0.2, more preferably at least 0.3 per 1000 carbon atoms, of C1-C4 alkyl groups as side chains. The amount of alkyl groups is preferably at most 20, more preferably at most 10, even more preferably at most 5, yet even more preferably at most 3, most preferably at most 1.5 per 1000 carbon atoms. The alkyl groups are preferably methyl or ethyl groups, more preferably methyl groups. The UHMWPE can be a single polymer grade, but also a mixture of two or more different polyethylene grades, e.g. differing in IV or molar mass distribution, and/or type and number of comonomers or side groups.

To prepare the UHMWPE solution, any technique known in the art and any of the known solvents suitable for gel spinning the UHMWPE may be used. Suitable examples of solvents include aliphatic and alicyclic hydrocarbons, e.g. octane, nonane, decane and paraffins, including isomers thereof; petroleum fractions; mineral oil; kerosene; aromatic hydrocarbons, e.g. toluene, xylene, and naphthalene, including hydrogenated derivatives thereof, e.g. decalin and tetralin; halogenated hydrocarbons, e.g. monochlorobenzene; and cycloalkanes or cycloalkenes, e.g. careen, fluorine, camphene, menthane, dipentene, naphthalene, acenaphtalene, methylcyclopentandien, tricyclodecane, 1,2,4,5-tetramethyl-1,4-cyclohexadiene, fluorenone, naphtindane, tetramethyl-p-benzodiquinone, ethylfuorene, fluoranthene and naphthenone. Also combinations of the above-enumerated solvents may be used for gel spinning of UHMWPE, the combination of solvents being also referred to for simplicity as solvent. In a preferred embodiment, the solvent of choice is not volatile at room temperature, e.g. paraffin oil. It was also found that the process of the invention is especially advantageous for relatively volatile solvents at room temperature, as for example decalin, tetralin and kerosene grades. In the most preferred embodiment the solvent of choice is decalin.

According to the invention, the UHMWPE solution is formed into fluid filaments by spinning said solution through a spinneret containing multiple spinholes. As used herein, the term "fluid filament" refers to a fluid-like filament containing a solution of UHMWPE in the solvent used to prepare said UHMWPE solution, said fluid filament being obtained by extruding the UHMWPE solution through the spinneret, the concentration of the UHMWPE in the extruded fluid filaments being the same or about the same with the concentration of the UHMWPE solution before extrusion. By spinneret containing multiple spinholes is herein understood a spinneret containing preferably at least 5 spinholes, more preferably at least 10, even more preferably at least 25, yet even more preferably at least 50, most preferably at least 100. Preferably the spinneret contains at most 3000, more preferably at most 1000, most preferably at most 500 spinholes.

Preferably, the spinning temperature is between 150° C. and 250° C., more preferably it is chosen below the boiling point of the spinning solvent. If for example decaline is used as spinning solvent the spinning temperature is preferably at most 180° C., more preferably at most 175° C., most preferably at most 170° C. and preferably at least 115° C., more preferably at least 120° C., most preferably at least 125° C. In case of paraffin, the spinning temperature is preferably below 200° C., more preferably between 130° C. and 195° C.

Preferably, the spinning speed is at least 1 m/min, more preferably at least 3 m/min, even more preferably at least 5 m/min, yet even more preferably at least 7 m/min, most preferably at least 9 m/min. Preferably, the spinning speed is at most 20 m/min, more preferably at most 18 m/min, even more preferably at most 16 m/min, yet even more preferably at most 14 m/min, most preferably at most 12 m/min. It was surprisingly observed that a relatively higher spinning speed and drawing rate can be used to form and draw the UHMWPE filaments of the invention in comparison with known processes of producing ultra-low dtex UHMWPE filaments. This resulted in an improved production output and a decreased production time, therefore, making the process of the invention more attractive economically. By spinning speed is herein understood the velocity in meters per min (m/min) of the extruded fluid filaments exiting the spinneret. By drawing rate is herein understood the drawing ratio divided by the time needed to achieve said drawing ratio.

According to the invention, each spinhole has a geometry comprising at least one zone, also called contraction zone, which is a zone with a gradual decrease in diameter. Preferably the gradual decrease in diameter has a cone angle of at least 10°, more preferably at least 15°, more preferably of at least 30°, even more preferably at least 45°. Preferably, the cone angle is at most 75°, more preferably at most 70°, even more preferably at most 65°. With cone angle is herein meant the maximum angle between the tangents to opposite wall surfaces of the contraction zone. For example, for a conical or tapered contraction zone, the cone angle between the tangents is constant, whereas for a so-called trumpet type of contraction zone the cone angle between the tangents will decrease with decreasing diameter. In case of a wineglass type of contraction zone the angle between the tangents passes through a maximum value. Because of the presence of said gradual decrease, a draw ratio $DR_{sp}$ is achieved in the spinhole. $DR_{sp}$ is the ratio of the solution flow speed at the initial cross-section and at the final cross-section of the contraction zone, which is equivalent to the ratio of the respective cross-sectional areas. For example, in case of a contraction zone having the shape of a frustum of a circular cone, $DR_{sp}$ is the ratio between the square of the diameters of the initial and final cross-sections of the contraction zone.

The diameter of the spinhole is herein meant to be the effective diameter, i.e. for non-circular or irregularly shaped spinholes, the largest distance between the outer boundaries of the spinhole.

Preferably, the initial and final cross-sectional areas, or the respective diameters thereof of the contraction zone, are chosen to yield a $DR_{sp}$ of at least 5, more preferably at least 10, even more preferably at least 15, yet even more preferably at least 20, yet even more preferably at least 25, yet even more preferably at least 30, yet even more preferably at least 35, most preferably at least 40.

Preferably, the spinhole further comprises upstream and/or downstream of a contraction zone, a zone of constant diameter equal with the diameter of the thereby correspondent cross-section of the contraction zone, the constant diameter zone having a ratio length/diameter of preferably at most 50, more preferably at most 30, even more preferably at most 20, most preferably at most 10. More preferably its ratio length/diameter is at least 2, even more preferably at least 4, most preferably at least 5.

Preferably, the downstream diameter of the spinhole from which the solution is issued in the air gap is between 0.1 and 1.5 mm, more preferably between 0.1 and 1.2 mm, more preferably between 0.1 and 0.9 mm, even more preferably between 0.1 and 0.8 mm, yet even more preferably between 0.1 and 0.7 mm, yet even more preferably between 0.1 and 0.5 mm, yet even more preferably between 0.1 and 0.45 mm, most preferably between 0.2 and 0.45 mm.

The fluid filaments formed by spinning the UHMWPE solution through the spinneret are extruded into an air gap, and then into a cooling zone from where they are picked-up on a first driven roller. The fluid filaments are stretched in the air gap with a drawing ratio $DR_{ag}$ of at least 30 by choosing an angular speed of the first driven roller such that said roller's surface velocity exceeds the flow rate of the UHMWPE solution issued form the spinneret. The draw ratio in the air gap, $DR_{ag}$, is preferably at least 40, more preferably at least 50, even more preferably at least 60, most preferably at least 80.

According to the invention, the fluid filaments are stretched with a total fluid draw ratio $DR_{fluid} = DR_{sp} \times DR_{ag}$ of at least 450, preferably at least 475, more preferably at least 500, even more preferably at least 550, yet even more preferably at least 600, yet even more preferably at least 650, yet even more preferably at least 700, most preferably at least 800. It was surprisingly found that it was possible to subject the fluid UHMWPE filaments in the process of the invention to a higher $DR_{fluid}$ than it was possible hitherto in processes producing ultra-low dtex filaments, while keeping the occurrence of breakages at the same level. Moreover, by increasing the $DR_{fluid}$ filaments with even lower dtex could have been obtained. A high $DR_{fluid}$ proved also beneficial for the tensile strength of the filaments.

It was found that using a too high total fluid draw ratio led to an increase in filament breakage. Hence, in a preferred embodiment, fluid filaments are stretched with a total fluid draw ratio $DR_{fluid} = DR_{sp} \times DR_{ag}$ of at the most 1200, preferably the at the most 1000, more preferably at the most 900, such as at the most 800.

In a preferred embodiment, $DR_{sp}$ is between 5 and 20, more preferably between 5 and 15, whereas the $DR_{ag}$ is increased to yield a $DR_{fluid}$ value of at least 450. It was found that these are the optimum values for said drawing ratios for achieving the advantages of the process of the invention.

The length of the air gap is preferably at least 1 mm, more preferably at least 3 mm, even more preferably at least 5 mm, yet even more preferably at least 10 mm, yet even more preferably at least 15 mm, yet even more preferably at least 25 mm, yet even more preferably at least 35 mm, yet even more preferably at least 25 mm, yet even more preferably at least 45 mm, most preferably at least 55 mm. The length of the air gap is preferably at most 200 mm, more preferably at most 175 mm, even more preferably at most 150 mm, yet even more preferably at most 125 mm, yet even more preferably at most 105 mm, yet even more preferably at most 95 mm, most preferably at most 75 mm.

Cooling, also known as quenching, the fluid filaments after exiting the air-gap to form solvent-containing gel filaments, may be performed by any method known in the art as for example in a gas flow and/or in a liquid cooling bath. Preferably, the temperature to which the fluid filaments are cooled is at most 80° C., more preferably at most 60° C., most preferably at most 40° C., preferably at least 1° C., more preferably at least 5° C., even more preferably at least 10° C., most preferably at least 15° C.

By air-gap is meant the length travelled by the fluid filaments before the fluid filaments are converted into solvent-containing gel filaments if gas cooling is applied or the distance between the face of the spinneret and the surface of the cooling liquid in the liquid cooling bath.

As used herein, the term "gel filament" refers to a filament which upon cooling develops a continuous UHMWPE network swollen with the spinning solvent. An indication of the conversion of the fluid filament into the gel filament and the formation of the continuous UHMWPE network may be the change in filament's transparency upon cooling from a translucent UHMWPE filament to a substantially opaque filament, i.e. the gel filament.

In the process of the invention, the gel filaments are subjected to a solvent removal step to form solid filaments, before, during or after drawing the solid filaments. The amount of residual spinning solvent, hereafter residual solvent, left in the solid filaments after the removal step may vary within large limits, preferably the residual solvent being in a weight percent of at most 15% of the initial amount of solvent in the UHMWPE solution, more preferably in a weight percent of at most 10%, most preferably in a weight percent of at most 5%. The amount of residual spinning solvent left in the solid filaments after the removal step may also be described relative to the total weight of the yarn including UHMWPE and solvent. In this case, the residual solvent is preferably at most 15 wt-% of the total weight of yarn, more preferably at most 10 wt-% of the total weight of yarn, and most preferably at most 5 wt-% of the total weight of yarn. The solvent removal process may be performed by known methods, for example by evaporation when a relatively volatile spinning solvent, e.g. decaline, is used to prepare the UHMWPE solution or by using an extraction liquid, e.g. when paraffin is used, or by a combination of both methods. Suitable extraction liquids are liquids that do not cause significant changes in the structure of the UHMWPE gel fibres and preferably those the spinning solvent can be separated thereof for recycling.

Drawing the solid filaments may be performed in accordance with any technique known in the art and in at least one drawing step with a draw ratio $DR_{solid}$ of at least 4. More preferably, $DR_{solid}$ is at least 7, even more preferably at least 10, yet even more preferably at least 15, yet even more preferably at least 20, yet even more preferably at least 30, most preferably at least 40. To reduce the risk of filament breakage, the draw ratio $DR_{solid}$ is preferably at the most 150, preferably at the most 100, more preferably at most 75, such as for example at most 50. More preferably, the drawing of solid filaments is performed in at least two steps, even more preferably in at least three steps. Preferably, each drawing step is carried out at a different temperature that is preferably chosen to achieve the desired drawing ratio without the occurrence of filament breakage. If the drawing of solid filaments is performed in more than one step, $DR_{solid}$ is calculated by multiplying the draw ratios achieved for each individual solid drawing step. Drawing the solid filaments is preferably carried out at a temperature of between 110 and 170° C., more preferably of between 120 and 160° C., most preferably of between 130 and 155° C. The temperature may also have an increasing profile preferably between 120 and 155° C.

In a preferred embodiment, after cooling the gel filaments in a liquid cooling bath, said filaments were introduced in an oven set at a temperature of preferably between 110 and 145° C., more preferably between 130 and 140° C., where the solvent was removed by evaporation while drawing the filaments with a draw ratio of at least 2, more preferably at least 4, most preferably at least 6 such that solid filaments exit the oven. In this step, the draw ratio is preferably less than 50, more preferably less than 40, yet more preferably less than 30, such as less than 15. The solid filaments are then preferably drawn in a second step in a second oven set at a temperature of preferably between 140 and 165° C., more preferably between 150 and 155° C. with a draw ratio of at least 6, more preferably at least 10, most preferably at least 15. In the second step the draw ratio is preferably less than 50, more preferably less than 40, yet more preferably less than 30, such as less than 20.

Optionally, the process of the invention may also comprise a step of removing the residual spinning solvent from the gel-spun UHMWPE filaments of the invention, preferably, said step being subsequent to the solid stretching step. In a preferred embodiment, the residual spinning solvent left in the gel-spun UHMWPE filaments of the invention is removed by placing said filaments in a vacuumed oven at a temperature of preferably at most 148° C., more preferably of at most 145° C., most preferably of at most 135° C. Preferably, the oven is kept at a temperature of at least 50° C., more preferably at least 70° C., most preferably at least 90° C. More preferably, the removal of the residual spinning solvent is carried out while keeping the filaments taut, i.e. the filaments are prevented from slackening.

Preferably, the gel-spun UHMWPE multifilament yarns of the invention at the end of the solvent removal step comprise spinning solvent in an amount of below 800 ppm. More preferably said amount of the spinning solvent is below 600 ppm, even more preferably below 300 ppm, most preferably below 100 ppm.

It was also surprisingly found that it was possible to apply a higher overall draw ratio ($DR_{overall}$) to the ultra-low dtex UHMWPE filaments of the invention without the occurrence of breakages, as compared to the $DR_{overall}$ previously reported in the state of the art. By $DR_{overall}$ is herein understood the multiplication of the draw ratios applied at different stages in the process of the invention, i.e. the draw ratios applied to fluid, gel and solid filaments. Accordingly, $DR_{overall} = DR_{fluid} \times DR_{gel} \times DR_{solid}$.

Preferably, the $DR_{overall}$ is at least 9000, more preferably at least 12000, even more preferably at least 15.000, yet even more preferably at least 18.000, yet even more preferably at least 20.000, yet even more preferably at least 25.000, most preferably at least 30.000. In one embodiment, the $DR_{overall}$ is at most 60.000, preferably at most 50.000, more preferably at most 40.000, such as for example at most 35.000.

The advantage of applying such high $DR_{overall}$ in the process of the invention is that UHMWPE multifilament yarns are obtained having an even higher tensile strength. An additional advantage is that the dtex of the filaments comprising said yarn is further lowered.

The invention further relates to an UHMWPE multifilament yarns having a tensile strength of at least 3.5 GPa and comprising filaments having a dtex of at most 0.5.

By filament is herein understood an elongated body, i.e. a body having a length much greater than its transverse dimensions, of regular or irregular cross-sections and having continuous and/or discontinuous lengths. A yarn as used herein includes a plurality of filaments. The yarn according to the invention may be a twisted or a braided yarn. In the context of the present invention a yarn is understood to be a gel-spun yarn.

Preferably, the filaments comprising the UHMWPE yarns of the invention have a dtex of at most 0.45, more preferably of at most 0.4, even more preferably of at most 0.35, yet even more preferably of at most 0.3, yet even more preferably of at most 0.25, yet even more preferably of at most 0.2, yet even more preferably of at most 0.15, most preferably of at most 0.1. Preferably, the UHMWPE filaments have a dtex of at least 0.01, more preferably of at least 0.03, even more preferably of at least 0.06, most preferably of at least 0.09. The dtex of said filaments can be reached with the process of the invention by choosing a higher $DR_{fluid}$ and/or $DR_{solid}$.

The tensile strength of the UHMWPE yarns of the invention is preferably at least 3.7 GPa, more preferably at least 4.0 GPa, even more preferably at least 4.3 GPa, yet even more preferably at least 4.5 GPa, yet even more preferably at least 5.0 GPa, yet even more preferably at least 5.5 GPa, most preferably at least 6 GPa. Tensile strengths within the disclosed ranges can be obtained by e.g. increasing $DR_{overall}$.

Preferably the tensile modulus of the UHMWPE yarns of the invention is at least 100 GPa, more preferably at least 130 GPa, even more preferably at least 160 GPa, most preferably at least 190 GPa.

The advantages of the UHMWPE yarns of the invention when compared with known UHMWPE yarns containing an equal number of UHMWPE filaments stem from its lower transversal dimensions and improved mechanical properties or combination of mechanical properties as for example tensile strength and/or elastic modulus.

It was surprisingly found that the UHMWPE yarns of the invention have advantages when used in semi-finished and end-use articles. Said articles, in particular fabrics, containing the UHMWPE yarns of the invention surprisingly show an increased acoustic absorption. Without being bound by any theory, the inventors believe that the ultra-low dtex filaments forming said yarns create an effective structure of air microchannels which allows for an optimum air permeability required to absorb sound energy. A further advantage stemming from the presence of the air micro-channels is that said articles further present an increased thermal insulation.

The invention therefore further relates to various semi-finished and end-use articles containing the UHMWPE yarns of the invention.

In particular the invention relates to a fabric comprising the yarns of the invention. The fabric may be of any known construction manufactured from yarns, e.g. woven, knitted, non-woven, e.g. felt and the like.

The invention also relates to medical devices, containing the UHMWPE yarn of the invention. Especially for medical applications where thin cables yet having a high tensile strength are desired, the UHMWPE yarn of the invention proved particularly advantageous. Preferably, the medical devices contain the UHMWPE yarn of the invention, said yarn comprising filaments having a residual solvent content in an amount of below 800 ppm, more preferably said amount being below 600 ppm, even more preferably below 300 ppm, most preferably below 100 ppm.

The invention relates more in particular to a surgical repair product and even more in particular to a suture and to a medical cable comprising the UHMWPE yarns of the invention. It was found that the suture and the medical cable of the invention posses very good knot strength. It was also found that these devices possess an increased retention of their mechanical properties. Also their flexibility was improved imparting said suture and cable thereof with increased handling properties.

The invention further relates to a vascular graft comprising the UHMWPE yarns of the invention. Such vascular grafts are used for example to replace, bypass or reinforce diseased or damaged sections of a vein or artery. It was found that the vascular grafts of the invention in addition to their excellent tensile strengths possess good oxygen permeability, tissue ingrowth characteristics as well as ease of handling. Preferably, the vascular grafts of the invention are made of knitted or woven continuous UHMWPE yarns of the invention.

The invention further relates to a medical device in the form of a mesh comprising the UHMWPE yarns of the invention. The advantage of such a mesh is that it can be produced thinner than known meshes. Preferably the mesh of the invention is knitted by a process which interlinks each UHMWPE yarn junction and which provides for elasticity in both directions. This construction permits the mesh to be cut into any desired shape or size without unraveling and furthermore, the bi-directional elastic property allows adaptation to various stresses encountered in the body.

Another type of medical device, which advantageously may comprise the yarn according to the invention, is implantable valves, such as heart valves. Examples of manufacturing and structures of such valves are for example described in EP 08014686.3 incorporated herein by reference.

The invention also relates to a rope containing the UHMWPE yarn of the invention. Preferably, at least 50% from the total weight of the fibres used to manufacture the rope consists of the UHMWPE yarns according to the invention. More preferably the rope contains at least 75 wt-% UHMWPE yarns of the invention, even more preferably at least 90 wt-%, most preferably the rope contains 100 wt-% UHMWPE yarns of the invention. The remaining weight percentage of the yarns in the rope according to the invention, may contain yarns comprising filaments made of other materials suitable for making filaments as for example metal, nylon, polyester, aramid, other types of polyolefin and the like, or combinations thereof. The advantage of the rope of the invention is that it provides the same tensile strength as a known rope for less weight.

The invention also relates to composite articles containing the UHMWPE yarn according to the invention.

In a preferred embodiment, the composite article contains at least one monolayer comprising the UHMWPE yarns of the invention. The term monolayer refers to a layer of yarns or strands containing yarns in one plane. The monolayer is preferably a unidirectional monolayer, i.e. a monolayer comprising unidirectionally oriented yarns, i.e. yarns in one plane that are essentially oriented in parallel. The advantage of using the yarns of the invention to obtain such a monolayer is that monolayers thinner than known monolayers comprising regular UHMWPE yarns can be obtained.

In a further preferred embodiment, the composite article is a multi-layered composite article containing a plurality of unidirectional monolayers the direction of the fibres in each monolayer preferably being rotated with a certain angle with respect to the direction of the fibres in an adjacent monolayer. Preferably, the angle is at least 30°, more preferably at least 45°, even more preferably at least 75°, most preferably the angle is about 90°.

Composite articles and in particular multi-layered composite articles proved very useful in ballistic applications, e.g. body armor, helmets, hard and flexible shield panels, panels for inserts or vehicle armouring and the like. Therefore, the invention also relates to ballistic-resistant articles as the ones enumerated hereinabove containing the UHMWPE yarns of the invention.

In a preferred embodiment of the invention, the composite article is essentially free of matrix material, such as adhesive or resin, to bond the UHMWPE yarn together. In this embodiment, the yarn is bonded by pressing yarn and/or layers under sufficient temperature and time to for bonding to take place. Such bonding may involve at least partial melting of the UHMWPE fibres.

It was also observed that the UHMWPE yarns of the invention showing the above mentioned unique combination of properties are suitable for use in other applications like for example, fishing lines and fishing nets, ground nets, cargo nets and curtains, kite lines, dental floss, tennis racquet strings, canvas (e.g. tent canvas), webbings, battery separators, capacitors, pressure vessels, hoses, automotive equipment, power transmission belts, building construction materials, cut and stab resistant and incision resistant and abrasion resistant articles, protective gloves, composite sports equipment such as skis, helmets, kayaks, canoes, bicycles and boat hulls and spars, speaker cones, high performance electrical insulation, radomes, and the like. Therefore, the invention also relates to the applications enumerated above containing the UHMWPE yarns of the invention.

The invention will be further explained by the following examples and comparative experiment.

Methods:

IV:

the Intrinsic Viscosity is determined according to method PTC-179 (Hercules Inc. Rev. Apr. 29, 1982) at 135° C. in decalin, the dissolution time being 16 hours, with DBPC as anti-oxidant in an amount of 2 g/l solution, by extrapolating the viscosity as measured at different concentrations to zero concentration;

Dtex:

filament's dtex was measured by weighing 100 meters of filament. The dtex of the filament was calculated by dividing the weight in milligrams to 10;

Tensile Properties:

tensile strength (or strength) and tensile modulus (or modulus) are defined and determined at room temperature, i.e., about 20° C., on multifilament yarns as specified in ASTM D885M, using a nominal gauge length of the fibre of 500 mm, a crosshead speed of 50%/min and Instron 2714 clamps, of type "Fibre Grip D5618C". On the basis of the measured stress-strain curve the modulus is determined as the gradient between 0.3 and 1% strain. For calculation of the modulus and strength, the tensile forces measured are divided by the titre, as determined by weighing 10 meters of yarns; values in GPa are calculated assuming a density of 0.97 g/cm$^3$.

Side Chains:

the number of side chains in a UHMWPE sample is determined by FTIR on a 2 mm thick compression moulded film, by quantifying the absorption at 1375 cm using a calibration curve based on NMR measurements (as in e.g. EP 02691 51);

COMPARATIVE EXAMPLE

A 9 wt-% solution in decalin of a UHMWPE homopolymer was made, the UHMWPE having less than 1 side group per 1000 per carbon atoms and an IV of 15.2 dl/g.

A 25 mm twin screw extruder was used that was equipped with a gear-pump. The UHMWPE solution was spun at a temperature of 180° C. through a spinplate having 64 spinholes into a nitrogen atmosphere with a rate of 1.5 g/min per hole.

The spinholes had an initial cylindrical channel with a of 3 mm diameter and length/diameter of 20, followed by a conical contraction zone with a cone angle of 60° that ended into a cylindrical channel with a diameter of 1 mm and length/diameter of 10. Accordingly, $DR_{sp}=9$ ($3^2/1^2$).

The fluid filaments entered a water bath kept at about 30° C. and with a water flow of about 70 liters/hour perpendicular to the filaments entering the bath. The fluid filaments were taken-up at such rate that a draw ratio $DR_{ag}$ of about 42 was applied to the fluid filaments in the air-gap of 27 mm. The total fluid draw ratio $DR_{fluid}$ was about 378. The gel filaments were subjected to a draw ratio $DR_{gel}$ of 1.1 and the solvent was removed thereafter to form solid filaments having a solvent content of about 1 wt-% of the initial amount of solvent in the UHMWPE solution.

Subsequently, the gel filaments entered an oven at 135° C. wherein solvent evaporation took place and were stretched therein with a draw ratio $DR_{solid\ 1}$ of 4. The solid filaments entered subsequently in a second oven being stretched with a draw ratio $DR_{solid\ 2}$ of 5 in at a temperature of 153° C.

The total draw ratio $DR_{overall}(=DR_{fluid} \times DR_{gel} \times DR_{solid\ 1} \times DR_{solid\ 2})$ amounted 7560. The above detailed process parameters together with the properties of the obtained yarn are summarized in Table 1.

Example 1-7

The Comparative Experiment was repeated with the variations as presented in Table 1. The non reported parameters were kept at the same values as those reported in the Comparative Experiment.

TABLE 1

|  | n | UHMWPE solution conc. [%] | $DR_{ag}$ | $DR_{fluid}$ | $DR_{solid\,1}$ | $DR_{solid\,2}$ | $DR_{overall}$ | Strength [GPa] | Modulus [GPa] | dtex |
|---|---|---|---|---|---|---|---|---|---|---|
| Comp. Exp. | 9 | 42 | 378 | 4 | 5 | 7560 | 1.84 | 37.5 | 3.19 |
| Ex 1 | 5 | 50.2 | 452 | 4 | 5 | 9944 | 4.6 | 137.9 | 0.26 |
| Ex 2 | 5 | 62.7 | 565 | 5 | 6 | 18645 | 4.6 | 159.5 | 0.22 |
| Ex 3 | 7 | 62.7 | 565 | 4 | 5.5 | 13673 | 4.2 | 119.1 | 0.4 |
| Ex 4 | 7 | 62.7 | 565 | 4 | 6 | 14916 | 4.1 | 130 | 0.32 |
| Ex 5 | 9 | 83.6 | 753 | 4 | 8 | 26505 | 4.5 | 133.9 | 0.39 |
| Ex 6 | 5 | 83.6 | 753 | 4 | 6.5 | 21535 | 5.2 | 190.7 | 0.14 |
| Ex 7 | 5 | 62.7 | 565 | 4 | 10 | 24860 | 5.3 | 188.4 | 0.11 |

The invention claimed is:

1. A gel-spinning process for making ultrahigh molecular weight polyethylene (UHMWPE) yarns comprised of UHMWPE gel-spun filaments, wherein the process comprises the steps of:
 a) preparing a solution of an UHMWPE in a solvent;
 b) spinning through a spinneret and into an air gap the solution of step a) to form fluid filaments, the spinneret containing multiple spinholes and wherein each spinhole comprises at least one zone with a gradual decrease in diameter and wherein the downstream diameter of the spinhole from which the solution is issued in the air gap is between 0.1 and 1.5 mm;
 c) drawing the fluid filaments with a fluid draw ratio $DR_{fluid}=DR_{sp}\times DR_{ag}$, wherein $DR_{sp}$ and $DR_{ag}$ are the draw ratios in the spinholes and in the air gap, respectively, wherein the fluid filaments are drawn with a fluid draw ratio $DR_{fluid}$ of 450-1200, provided that $DR_{ag}$ is at least 50, and with an overall draw ratio $DR_{overall}$ of 12000-50000, wherein $DR_{overall}=DR_{fluid}\times DR_{gel}\times DR_{solid}$ where $DR_{fluid}$ is the fluid draw ratio of the fluid filaments, $DR_{gel}$ is a draw ratio of the gel filaments and $DR_{solid}$ is a draw ratio of the solid filaments;
 d) cooling the fluid filaments to form solvent-containing gel filaments; and
 e) removing at least partly the remaining solvent from the gel filaments to form solid filaments, before, during or after drawing the solid filaments with a draw ratio $DR_{solid}$ of at least 4 and thereby obtain a UHMWPE yarn having a tensile strength of 3.5-5.5 GPa comprised of UHMWPE filaments of 0.06-0.5 dtex.

2. The process of claim 1, wherein $DR_{sp}$ is between 5 and 20.

3. The process of claim 1, wherein $DR_{fluid}$ is 500-1000.

4. The process of claim 1, wherein $DR_{overall}$ is 12000-35000.

5. The process of claim 1, wherein $DR_{sp}$ is between 5 and 15.

6. The process of claim 1, wherein the spinneret contains 5-1000 spinholes.

7. The process of claim 1, wherein $DR_{fluid}$ is 550-900.

8. The process of claim 1, wherein $DR_{ag}$ is at least 60.

9. The process of claim 1, wherein the air gap has a length of 1-200 mm.

10. The process of claim 1, wherein the air gap has a length of 15-150 mm.

11. The process of claim 1, wherein cooling of step d) is performed by quenching the fluid filaments in a liquid cooling bath to a temperature of at most 60° C.

12. The process of claim 1, wherein $DR_{solid}$ is 7-100.

13. The process of claim 1, wherein $DR_{solid}$ is 10-50.

14. The process of claim 1, wherein the UHMWPE is a linear polyethylene having less than 1 branch per 300 carbon atoms, and having an intrinsic viscosity of 5-30 dl/g.

* * * * *